UNITED STATES PATENT OFFICE.

EBEN N. HORSFORD, OF CAMBRIDGE, MASSACHUSETTS.

PULVERULENT PREPARATION OF PHOSPHORIC ACID.

SPECIFICATION forming part of Letters Patent No. 229,705, dated July 6, 1880.

Application filed May 14, 1880. (No specimens.)

*To all whom it may concern:*

Be it known that I, EBEN N. HORSFORD, of Cambridge, in the State of Massachusetts, have invented a certain new and useful Improvement in Pulverulent Preparations of Phosphoric Acid, for use in the manufacture of baking-powders and for other purposes, and in the art of producing the same, whereof the following is a full, clear, and exact description.

In Letters Patent No. 14,722, granted to me April 22, 1856, and in the reissue thereof, No. 2,979, dated June 9, 1868, there was described a pulverulent preparation of phosphoric acid having the characteristics and capable of the uses therein specified. The phosphoric acid of my former preparations was, however, invariably combined with lime in such proportions as to form phosphates possessing more or less acid reaction, whether wholly united to the base, so as to constitute therewith a strictly chemical salt, or only partially so. By as much, therefore, as this combination with a base neutralized the acidity of the phosphoric acid, by so much were its strength and efficiency diminished for the purposes of employment with alkaline carbonates in bread-making or in other processes requiring the liberation of carbonic-acid gas. But until my discovery and invention, herein to be disclosed, I had not known or supposed that phosphoric acid uncombined with a base or dissociated from acid phosphates formed therewith could be reduced to a pulverulent condition by admixture with a neutral substance like starch and kept inert, to be utilized after the manner of my former preparations. This discovery and the invention by which I have made it practically available enable me to preserve the full strength of the phosphoric acid for the purposes of reaction upon alkaline carbonates without the waste and expense attending its partial neutralization by a base.

My present invention may be efficiently practiced by the following mode of procedure: I take acid-phosphate liquor, substantially such as is prepared by the process described in my patent of April 22, 1856, and standing, for example, at 15° Baumé, or the same may be otherwise produced by adding, with constant agitation of the liquid, one thousand six hundred pounds of pulverized bone-black to a diluted solution of one thousand one hundred pounds of oil of vitriol, (one of oil of vitriol to three of water), and when the decomposition is complete, which requires some eighteen hours of continuous agitation, the emulsion will be thrown upon a cloth filter and leached. The first portions of the liquor being above 15° Baumé and the last portions below, it is easy to make a liquor of precisely the strength required; and after concentrating the liquor in porcelain-lined vessels to about one-third of its volume, I add thereto, based on analysis, an equivalent of sulphuric acid for the lime present in combination with phosphoric acid, thereby producing gypsum and setting free phosphoric acid. The emulsion is allowed to cool and the gypsum is separated by filtration. The filtrate is then further concentrated in porcelain to about one-fourth of the original volume. To this, after cooling, I add, in successive portions, with stirring for thorough incorporation, a weight of starch inversely proportioned to the intended acid strength of the product. Thus, if I desire that twenty parts of the pulverulent acid shall neutralize nine parts of bicarbonate of soda, I add, for every one thousand cubic centimeters of the original liquid of 15° Baumé three hundred and sixty grams of starch. I incorporate these constituents intimately, spread the mass out to dry in a warm room, and, when dry, pulverize it.

In reducing the acid phosphate liquor of my former patent, hereinbefore specified, to a pulverulent condition, as therein set forth, the quantity of starch required was as about one hundred grams to every one thousand cubic centimeters of the liquor taken at 15° Baumé. It will therefore be seen that in order to accomplish the results attained by my present invention a very much greater relative proportion of the neutral substance is needed.

The pulverulent phosphoric acid so produced I have found by quantitative test to have the same strength that the liquid alone possessed after separation of the gypsum. It may be thoroughly mixed with dry bicarbonate of soda to form a baking or effervescing powder, which will keep in bottles or cans without reaction, and will, when mixed with water, yield carbonic-acid gas for the purposes desired.

The gypsum formed by the introduction of the sulphuric acid into the acid phosphate liquor does not impair the acid strength of the product, if permitted, without being filtered off, to remain as a part of it; but its elimination is preferable, especially for pharmaceutical purposes.

I am aware that M. Blanchard, of Puteaux, France, has described a process of separating lime from acid phosphate liquor by adding an equivalent of sulphuric acid, evaporating the liquor, and separating the gypsum produced by decantation of the supernatant liquor; but this does not constitute my invention.

I claim as my invention—

1. The process of producing pulverulent phosphoric acid by treating the acid liquid described herein so as to bring it to the condition of free phosphoric acid, and combining the same with starch in about the proportions stated, drying, and pulverizing.

2. A pulverulent preparation of phosphoric acid substantially free from combination or association with any base, and kept in the state of dry powder by admixture only with a neutral substance like starch.

3. A baking or effervescing powder consisting of the admixture of pulverulent phosphoric acid, substantially such as described, with a dry alkaline carbonate.

Cambridge, May 13, 1880.

E. N. HORSFORD.

Witnesses:
 H. S. EUSTIS,
 GEO. A. BARTLETT.